March 14, 1950  L. MAZZONI  2,500,258
INJECTION MOLD
Filed Feb. 5, 1947  3 Sheets-Sheet 1
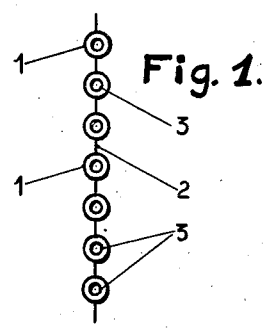
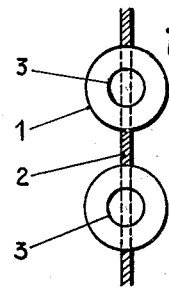
Fig. 1.  Fig. 2.
Fig. 12  Fig. 11  Fig. 13
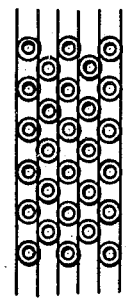
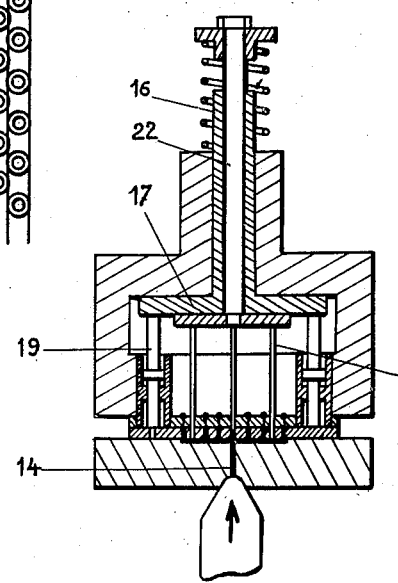
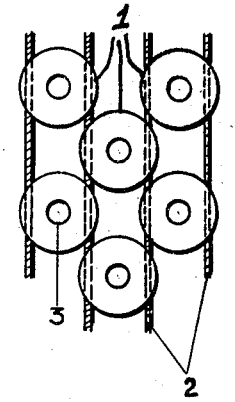
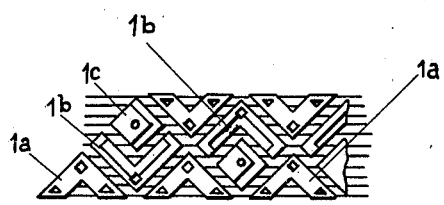
Fig. 14
INVENTOR
LUCIEN MAZZONI
BY Adams + Bush
ATTORNEYS

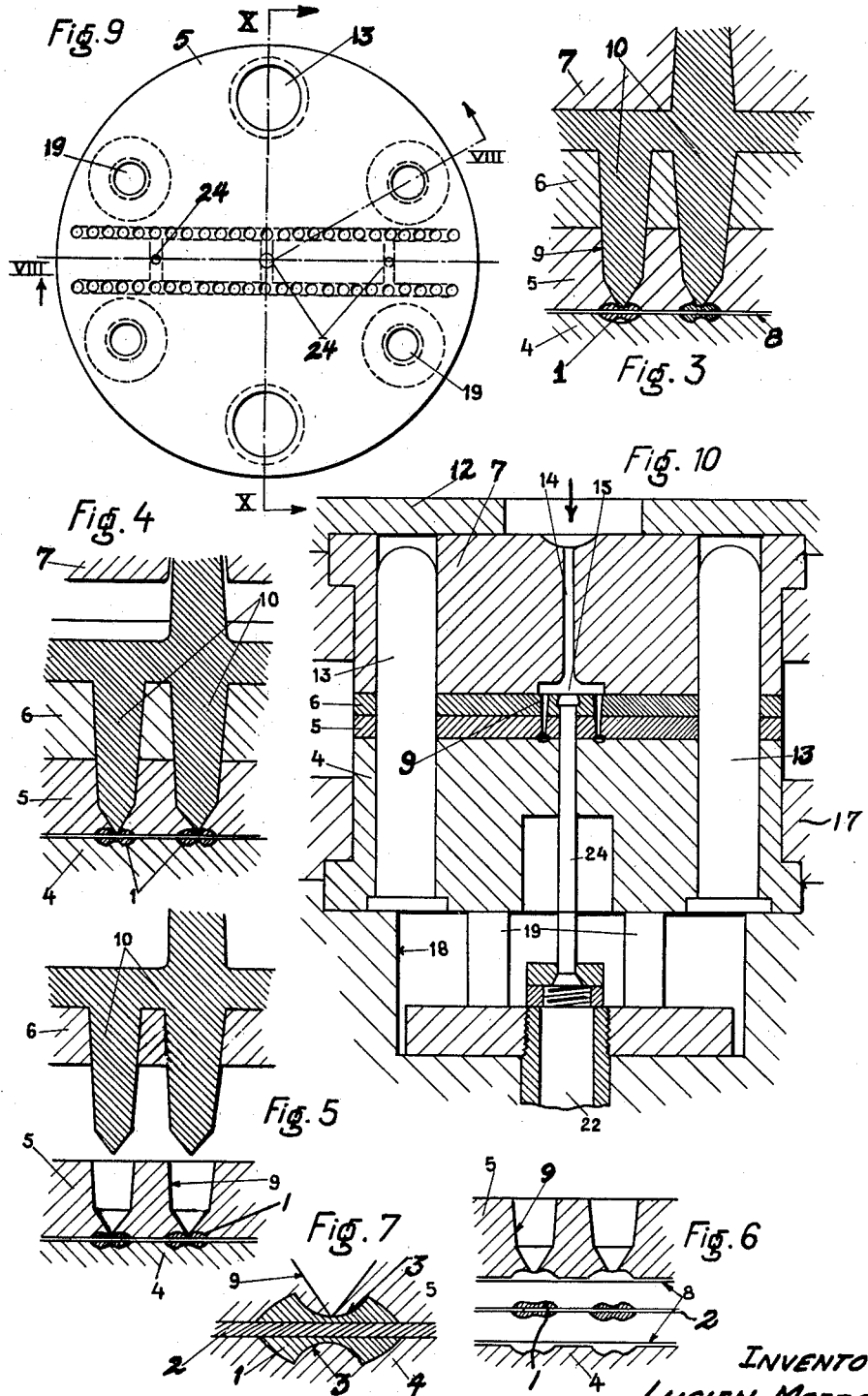

Patented Mar. 14, 1950

2,500,258

UNITED STATES PATENT OFFICE 2,500,258

INJECTION MOLD

Lucien Mazzoni, Lyon, France

Application February 5, 1947, Serial No. 726,533
In France June 24, 1943

Section 1, Public Law 690, August 8, 1946
Patent expires June 24, 1963

2 Claims. (Cl. 18—36)

The present invention relates to molds for the production of articles in molded material and more particularly small articles arranged in large numbers in the mold.

In known processes of manufacture of articles of the kind in question, the disadvantage arises that after opening the mold each article remains connected with the material which is solidified in the channels in the mold, and which connects together all the articles made in the course of a single operation. It is necessary, therefore, to detach these articles one by one which involves a supplementary operation of careful finishing which is slow and relatively costly in the case of articles of small individual monetary value.

The present invention has for its object to provide a mold permitting of avoiding the mentioned disadvantage, by positioning the outlet of the channel for injecting the molding material corresponding to the article to be produced, at the bottom of a depression provided on the latter. By reason of this particular arrangement, when the material is broken at the right of the point of attachment of the article to the material filling the channels of the mold, the fracture is produced at the exact center of the depression. It does not alter the general symmetry, and any roughness, located more or less at the bottom of the depression, remains without effect and cannot disturb the wearer of such articles intended for personal wear.

According to another feature of the present invention, such a mold is applied to the manufacture of articles such as chaplets, by shaping the beads of the latter in the form of pastilles or lozenges having a central depression and molding them directly on a connecting braid or cord.

The present invention, moreover, concerns the application of a mold of this kind to the production of pseudo-fabrics formed by parallel threads or braids connected by pastilles with a central depression surmounting them in pairs.

The pastilles referred to may take any desired form, for example that of thin plates, and they may thus surmount more than two threads according to circumstances.

The present invention has additionally for its object to provide a mold more especially intended for carrying out the above defined method, the mold being characterised mainly in that the separation of the mold is carried out in two steps, the first corresponding to the removal of the material filling the injection channels while the articles remain held therein which produces the breakage of the connection between the latter and the mass, and the second corresponding to the removal of the molded articles themselves, separated and finished.

It is moreover to be understood that the present invention also includes articles manufactured by the above method and particularly those obtained by means of a mold of the kind described.

The annexed drawing, given by way of example, will permit of a better understanding of the present invention, the features which it presents, and the advantages which it is capable of affording.

Fig. 1 is a fragmentary diagrammatic view of a chaplet according to the present invention. Fig. 2 is a view to an enlarged scale showing the detail of the shape of the beads. Figs. 3 to 6 show in section the various successive phases of the molding operation leading to the production of the chaplet shown in Fig. 2.

Fig. 7 is a section to enlarged scale of a bead within the mold, after separation from the corresponding mass in the injection channels.

Fig. 9 is an end view of one of the parts of the mold in which the plane of the section of Fig. 8 is indicated at VIII—VIII.

Fig. 10 is a section on the line X—X of Fig. 9.

Fig. 11 is a diagrammatic section showing to a small scale the position of the mold during the injection of the material.

Figure 8:
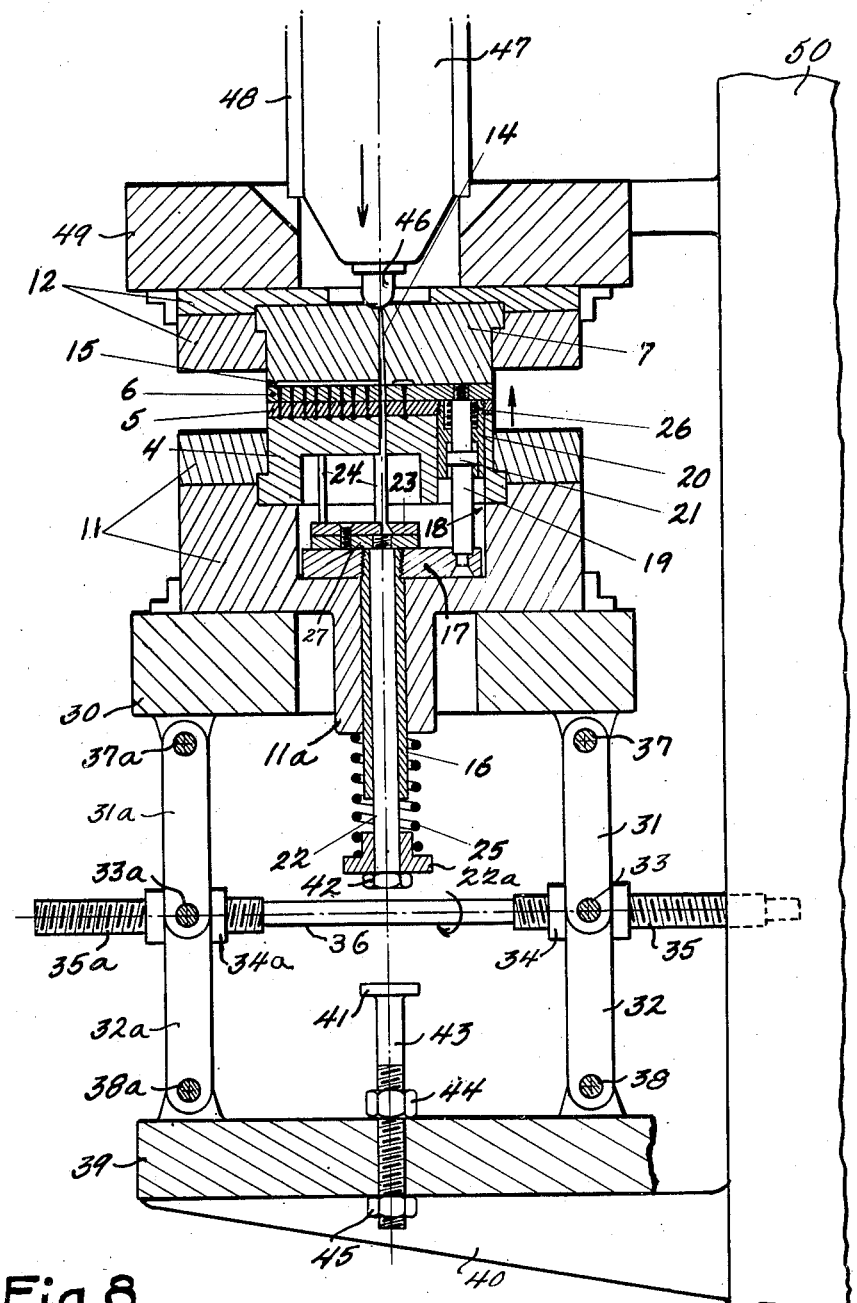
Fig. 8 is a general axial section of a mold for carrying out the molding operation according to Figs. 3 to 6.

Figs. 12 and 13 respectively indicate to a small scale and to a large scale a pseudo-fabric according to the present invention.

Fig. 14 shows another type of pseudo-fabric comprising shaped small plates.

The chaplet according to Figs. 1 and 2 is constituted by a series of pastilles or lozenges or beads molded on a cord 2. Each pastille 1 is of circular form and has at its center a depression 3. Fig. 7 shows the detail of the shape of a pastille with the two depressions opposite one another on opposite faces.

The pastilles 1 are molded in a mold comprising a certain number of superposed parts 4, 5, 6, 7, as indicated in Fig. 3. The mold has successive die cavities or impressions of the form of the pastilles to be molded and these impressions are connected by a groove 8 in which may lie the cord or braid 2 on which the pastilles are to be molded. Obviously, the mold comprises in addition conical tapered channels 9 for the admission of the injection material. Each channel 9 leads into the corresponding die cavity or impression at the center of the bead or at the bottom of the depression 3, by a conical part terminating in a connecting opening of very small diameter.

When the material is injected and solidified in the closed mold, the parts appear as indicated in Fig. 3, the channels 9 being filled with material which forms what may be called the injection "carrot" or runner 10. The pastilles or beads are all connected with the "carrot" in one piece.

In order to detach them, the "carrot" is first freed by raising the upper part 7 of the mold (Fig. 4). Then the guard 6 is raised while the part 5 is held against the part 4. The molding die cavities or impressions being provided between the parts 5 and 4 which are held, the molded beads or pastilles cannot rise. On the other hand, the "carrot" or runner is lifted by the guard part 6 located beneath it. The "carrot" is thus subjected to a pull which causes a breakage at the point of least resistance, that is to say at the right of the outlet of each conical channel 9 at its restricted orifice into the die cavity at the bottom of the corresponding depression 3 (Figs. 5 and 7) and it is thus torn away from the molded bead.

It only remains to lift the part 5 to separate the pastilles or beads molded on the braid 2, finished and entirely independent of any injection "carrot" (Fig. 6). The break between the pastille and the "carrot" takes place at the bottom of the depression 3 where its resultant rough surfaces cannot affect the wearer.

Another important advantage of the central depression 3 provided on each face of the pastille 1 (Fig. 7) is to create at the outlet of the injection channel 9 a zone of reduced thickness in which the braid 2 is to some extent held, which prevents the latter from being deformed excessively, under the action of the pressure of the material on its entry under pressure. The braid remains thus substantially in the middle plane of the pastille, which avoids any unsatisfactory result.

The essential elements of the mold according to the present invention will be apparent from the preceding description by reference to Figs. 3 to 7. The mold comprises parts providing for the real molding of the articles (parts 4 and 5), separate parts providing for the formation of the "carrot" or runner (parts 6 and 7) and means by virtue of which the "carrot" is torn from the molded parts still held between the parts corresponding to them. Figs. 8 to 11 show one example of construction of a machine using such a mold.

The mold die plates and locking parts 4, 5, 6 and 7 (Fig. 8) are placed one on top of the other, the end parts 4 and 7 being extended to form heads held respectively between the two halves of a lower locking plate 11 and of an upper plate 12 and adapted to be pressed against one another by a suitable press. Posts 13 (Fig. 10) connected to the lower part 4 provide for the guiding of the various parts. The upper part 7 carries the injection orifice 14 leading to channels 15 (Figs. 8 and 10) by which the molding material passes to the individual channels above described.

The mechanism for opening the mold comprises a tubular central push rod 16 fixedly attached to a movable plate 17 located in a suitable chamber 18 in the lower plate 11, the plate 17 fixedly carrying four push rods 19 (Figs. 8 and 9) fixed to the guard plate part 6 forming the head of the individual channels 9.

The push rods 19 pass freely through the lower part 4 of the mold and pass also through the sockets 20 fixedly attached to the die plate parts 5 forming the base of the channels 9 and the top of the molding die cavities, the said sockets passing with gentle friction through the lower part 4 in which they slide freely. The push rods are provided with enlarged shoulders 21 which, normally disposed in a recess in the sockets 20, abut against the latter when the push rods 19 have been raised to a certain extent, themselves thus moving the part 5 itself.

Finally, the tubular central push rod 16 is traversed by a solid push rod 22 threadedly operating a plate 23 which carries three rods 24 (Figs. 8, 9 and 10) which, passing through the parts 4, 5, 6, push against the solidified runner material in channel 15 and form ejectors for the "carrot" in the part 6 of the mold.

A strong spring 25 urges the entire assembly of the push rods downwards. On the other hand, the springs 26 mounted on the push rods 19 tend to raise the guard part 6 with respect to the part 5, pressing against the shoulders of sockets 20.

A convenient means for bringing together and separating lower locking plate 11 and upper plate 12 may consist of a knuckle joint arrangement. The upper supporting annular plate 49 and the lower block 40 are carried on the frame 50 of the molding machine. The lower fixed plate 39 is attached to block 40. An annular thrust block 30 bears against the lower face of locking plate 11. A downwardly projecting shoulder of the lower part of plate 11 extends through the central aperture of annular block 30.

The two plates 11 and 12 are each made in two halves to permit the insertion and removal of the molding heads 4 and 7.

The opening and closing of the mold may be controlled by the rotation of a shaft 36. A knuckle joint comprises two arms 31, 32 pivoted at 33 on a threaded sleeve 34 and also respectively pivoted at 37 to block 30 and at 38 to plate 39. A second knuckle joint comprises similar elements 31a, 32a, 33a, 34a, 37a, 38a. Shaft 36 has two oppositely threaded portions 35, 35a, which respectively engage threaded sleeves 34, 34a. When shaft 36 is rotated in the direction of the arrow, the two sleeves 34, 34a, are driven away from each other, and the two knuckle joints bend and retract, and since pivots 38, 38a, are fixed with reference to the frame, the block 30 is pulled down and pulls down with it plate 11. Rod 22 carries at its lower end a nut 42. A bolt 43 having a head 41 is bolted through plate 39 and held thereagainst by nuts 44, 45. During the course of the downward travel of plate 11, the nut 42 descends to strike head 41, which stops further travel of nut 42 and flange 22a and pushes rod 22 upwardly against the action of spring 25.

When the shaft 36 is rotated in the direction opposite to the arrow, the sleeves 34, 34a are returned toward each other and extend the arms 31, 32, 31a, 32a, to the position shown in Fig. 8, and the mold is closed. Pressure is thus applied to press together plates 11 and 12.

The material to be molded is held in receptacle 47 and it passes through channel 46 to injection orifice 14. An annular heating element 48 may be provided surrounding the receptacle.

The operation is as follows:

The mold including parts 4, 5, 6, 7, being closed and held by a press provided for this purpose against the action of the springs 26, the material is injected by means of the injection device. Fig. 11 shows the general arrangement of the parts during the injection. The material fills all the channels 14, 15 and 9, and thus reaches the molded cavities or impressions which it also fills, surrounding the braid 2 which passes through them.

When the material has become solidified by cooling or polymerisation according to circumstances, the mold is released or opened by separating from the rest of the mold the upper locking part 7 connected to the outer locking part 50 of the press. The lower part 4 of the mold descends downwardly away from fixed upper part 7 by virtue of the action of the knuckle joint arrangement 31—35. The spring 25 is sufficiently strong to hold the plates 23 and 17 at the bottom of the chamber 18 in spite of the action of the springs 26 which tend to raise the guard part 6 with the push rods 19.

The central solid push rod 22 is now progressively operated, which may be done manually or by means of the control shown, and against the action of the spring 25, which raises the plate 23 (with the rods 24) and permits the plate 17 to rise under the action of the springs 26 taking with them the guard part 6 which raises with it the "carrot" which is torn from the molded parts as explained above with reference to Fig. 5. The guard part 6 ceases to rise when the shoulders 21 abut against the shoulders of sockets 20. Then the rods 24 continuing their upward movement engage the solidified runner in channel 15 and eject the "carrot."

As the upward movement of the central solid push rod 22 continues as by manual actuation, the outer tubular push rod 16 is eventually displaced in turn. The plate 17 then resumes its upward movement raising the push rods 19 which, by the sockets 20, raise the upper die plate part 5 which releases the molded parts themselves and permits their removal. The braid or cord can then be advanced by a suitable amount in order to mold on it a new row of beads or pastilles.

As Fig. 9 shows the mold is arranged to mold simultaneously two series of beads or pastilles on two separate braids.

As has been explained above, the present invention is applicable not only to beads or pastilles mounted on a single cord or braid after the manner of a chaplet, but also to pseudo-fabrics formed of parallel threads connected in pairs by beads or pastilles mounted on two threads at a time. Figs. 12 and 13 show such an arrangement. It will be understood without further explanation that the method of manufacture remains identically the same except that the mold comprises a certain number of adjacent rows of impressions or die cavities arranged in quincunx with grooves for the location of the threads arranged to cut alternately one impression of one row and one of another. Here, the central depressions 3 can no longer serve to centre the thread on which the pastille or bead in question is mounted since each pastille 1' is mounted on two lateral threads 2' (Fig. 13). Their purpose is thus to hide the small break separating the pastille from the "carrot" which is created on opening the mold. Often enough this can be dispensed with without disadvantage.

Instead of constructing a pseudo-fabric by means of circular pastilles or beads surmounting two threads as in Figs. 12 and 13, plates of any other desired form may be provided mounted on any number of threads. Fig. 14 shows an example of such a construction. Plates 1a, 1b and 1c of different forms for the purpose of making a different design, extend over and engage five to seven threads. It will be seen that there can thus be produced a whole series of different designs. It is, in general, easy to arrange the point of connection of each plate to the "carrot" at a point of the design where the break is invisible; at an angle, projection, etc. or in a depression provided for the purpose.

It should be understood that the preceding description is given only by way of example and does not limit the scope of the present invention in any way. No departure from the invention would be made by replacing the details of construction described by other equivalents. Although the present invention is more especially intended for the molding of beads or pastilles or the like on braids or cords, it could equally well be applied with advantage to the molding of articles separate and distinct from any connecting cord or braid such as counters, buttons, etc. In spite of the advantage which a mold of the kind described offers or of any other equivalent, the method described can likewise be employed with any known type of mold, pulling the articles from the "carrots" after the mold has been opened either by hand or by suitable mechanical means.

It will be apparent to those skilled in the art that my invention is susceptible of modifications to adapt the same to particular applications, and all such modifications which are within the scope of the appended claims I consider to be comprehended within the spirit of my invention.

I claim:

1. In a molding machine for molding small objects such as beads, a lower die plate, an upper die plate, a guard plate positioned above said upper die plate, an upper locking plate positioned above said guard plate, a lower locking plate positioned below said lower die plate, and fixedly attached thereto, said upper die plate and said guard plate being provided with registering downwardly tapered conical tubes terminating by a restricted orifice in the registering die cavities of said die plates, said upper locking plate being provided with a distributing channel connected to the upper enlarged base ends of said tubes, said lower locking plate being provided with a central recess, a master plate mounted within said recess, a hollow shaft, said lower locking plate being provided with an aperture wherein said shaft is slidably received, said master plate being fixedly attached to said shaft, said lower die plate and said upper die plate being provided with bores extending from said recess in said lower locking plate to said guard plate, rod members passing through said bores and being fixedly attached to said master plate and to said guard plate, first resilient means urging apart said upper die plate and said guard plate, second resilient means urging said shaft downwardly and outwardly from said lower locking plate, said second resilient means being in normal position substantially more powerful than said first resilient means, said rod members and said upper die plate comprising mutually engageable limiting means adapted to limit the displacement of said rod members through said upper die member after a determined travel of said rod members and thereafter causing said rod members to displace said upper die plate relative to said lower die plate, a spindle displaceably mounted within said tubular shaft and carrying at its outer end enlarged terminal means abutting the outer end of said shaft, and being threaded at its inner end, an auxiliary plate positioned above and adjacent said master plate and being provided with a threaded aperture for receiving the threaded end of said spindle, a plurality of auxiliary rods carried by said auxiliary plate and extending through apertures in said die plates and said guard plate into engagement with material in said distributing channels, whereby progressive displacement of said spindle automatically first permits said first resilient means to separate said guard plate from said upper die plate and thereby tear solidified molding material within said tubes from connection with molded objects in the die cavities at said restricted orifice thereof, and second to lift the runners in said distributing channels carrying the solidified material in said tubes away therefrom, and third to lift said upper die plate from said lower die plate.

2. A molding machine according to claim 1, said die cavities in said upper die plate having a contour having a reentrant portion adapted to form a substantial depression in the object molded therein, and said restricted orifice of each said conical tube terminating in a said reentrant portion.

LUCIEN MAZZONI.

REFERENCES CITED

The following references are of record in the file of this patent:

UNITED STATES PATENTS

| Number | Name | Date |
|---|---|---|
| 2,302,342 | Nast | Nov. 17, 1942 |
| 2,341,404 | Winterhalter | Feb. 8, 1944 |
| 2,415,961 | Nast | Feb. 18, 1947 |

OTHER REFERENCES

"Mold designed to trim sprues," Modern Plastics, March 1942. Copy in Div. 15.

Ser. No. 285,944, Swarovski (A. P. C.), published April 27, 1943.